(12) United States Patent
Nejah

(10) Patent No.: US 8,290,456 B2
(45) Date of Patent: Oct. 16, 2012

(54) DIGITAL ANTENNA

(75) Inventor: Allen Nejah, San Jose, CA (US)

(73) Assignee: SunMan Engineering, Inc., San Jose, CA (US)

( * ) Notice: Subject to any disclaimer, the term of this patent is extended or adjusted under 35 U.S.C. 154(b) by 389 days.

(21) Appl. No.: 12/537,221

(22) Filed: Aug. 6, 2009

(65) Prior Publication Data

US 2010/0034317 A1    Feb. 11, 2010

Related U.S. Application Data

(60) Provisional application No. 61/086,549, filed on Aug. 6, 2008.

(51) Int. Cl.
*H04B 1/18* (2006.01)

(52) U.S. Cl. .................. 455/150.1; 455/90.1; 455/344; 455/347

(58) Field of Classification Search .............. 455/66.1, 455/90.1, 150.1, 344–350
See application file for complete search history.

(56) References Cited

U.S. PATENT DOCUMENTS

| | | | |
|---|---|---|---|
| 6,728,522 B1 * | 4/2004 | Marrah et al. | 455/179.1 |
| 7,352,995 B2 * | 4/2008 | Pasternak | 455/22 |
| 7,555,277 B2 * | 6/2009 | Lindenmeier et al. | 455/277.2 |

* cited by examiner

*Primary Examiner* — Nhan Le

(74) *Attorney, Agent, or Firm* — Patent Law Group LLP; David C. Hsia

(57) ABSTRACT

A radio system for a motor vehicle includes a digital antenna coupled by a digital link to a base unit. The digital antenna includes an antenna and a programmable radio tuner coupled to the antenna located exterior of the vehicle, and a first network interface coupled to the radio tuner. The radio tuner selectively tunes to a radio frequency (RF) and convert a RF signal to a baseband signal. The first network interface transmits the baseband signal over the digital link to the base unit.

16 Claims, 3 Drawing Sheets

DIGITAL ANTENNA

CROSS REFERENCE TO RELATED APPLICATIONS

This application claims the benefit of U.S. Provisional Application No. 61/086,549, filed Aug. 6, 2008, which is incorporated herein by reference. This application is related to U.S. Patent application Ser. No. 12/537,223 entitled "Detachable Vehicle Computing Device," which is concurrently filed and incorporated herein by reference.

FIELD OF INVENTION

This present disclosure relates to wireless communications, and more specifically to a radio system with a digital antenna.

DESCRIPTION OF RELATED ART

Traditionally, radio equipment is localized near the operator. The antenna is generally installed remotely where reception can be optimized. The cable between the radio equipment is traditionally a coax cable, which carries the transmission signal, the receiving signal, or both. In some installations, this cable can be fairly long. Other installations utilize waveguides to transfer the radio frequency (RF) energy to or from the antenna.

There are various problems associated with transferring the RF energy from the antenna to the radio equipment. One problem is power loss. Mismatches in impedance can cause some of the RF energy to be reflected back to its source. The transmission line comprising either a coaxial cable or a waveguide exhibit loss as the wave propagates across the medium. The longer the length of the transmission line, the greater the loss. Another problem is that coaxial systems exhibit a small amount of non-linearity in the medium, thereby adding frequency dependent noise with the signal. As electronics age, particularly high wattage devices such as tubes, the impedance can shift, causing the voltage standing wave ratio (VSWR) to change. This means that much of the system requires continual maintenance in order to ensure maximal performance. This maintenance can be expensive because highly skilled technicians are required to periodically service the equipment, transmission lines, and antenna systems.

Saving power is a primary concern even in non-commercial installations. Ham radio enthusiasts would be greatly benefited by having more RF signal delivered to or from the antenna, as well as a reduced power bill from the electric utility company.

The main reason that RF cabling is used is because of the complexity and electronics involved with tuning to a given frequency. A technique known as heterodyning involves mixing or multiplying a carrier frequency with a signal. This creates a sum and difference bands. Heterodyning can therefore move a band-limited signal to a new frequency band that is either higher or lower than the original. Heterodyning techniques are used to recover a modulated signal or to create a modulated carrier signal. By changing the frequency, also known as tuning, the baseband signal can be recovered.

Cars are generally surrounded with metal making it difficult for in-dash radio equipment to receive a good signal. New technologies are now including entertainment where it is highly desirable to provide television and radio entertainment for the passengers. Other radio applications include communications with internet service providers, and cell phone providers. Technologies continue to evolve with the list of standards increasing. Some are as follows: LTE, GSM, CDMA, WiMax, G3, G4, etc. Similar to the problems of home reception, the mobile problem is often more difficult as the dynamics of the reception are continually in motion.

BRIEF DESCRIPTION OF THE DRAWINGS

In the drawings.

Use of the same reference numbers in different figures indicates similar or identical elements.

DETAILED DESCRIPTION

In embodiments of the present disclosure, a radio system is provided where various functions or components of the conventional radio equipment are relocated to form a digital antenna and a base unit, and the conventional frequency (RF) signal transmission line is replaced with a digital communication link between the digital antenna and the base unit. In some embodiments, RF analog components are relocated near the antenna to form the digital antenna. They include but are not limited to RF tuning sections, local oscillators, mixers, heterodyning circuits, up/down converters, phase lock loops (PLL), automatic gain control circuits (AGC), and RF filters. In some embodiments, low frequency or baseband analog components remain in the conventional radio equipment close to the user, now referred to as the base unit. They include but are not limited to microphone amplifier circuits, speaker driving electronics, keying circuits, analog-to-digital (ADC), digital-to-analog (DAC), and low pass filters.

In some embodiments, the digital communication link carries a digitized version of the baseband signal, and control data stream that controls the remote digital antenna along with any other configuration data. The signal transmission over the digital communication link may be bidirectional. The digital communication link may be a wired or wireless link. Depending on the embodiment, the digital communication link may utilize any of the existing digital communications standards including but not limited to Ethernet (10T, 100T, 1000T, fiber optic), USB, FireWire (1394), serial peripheral interface (SPI), WiFi, and Bluetooth.

In some embodiments, a simple multi-media device such as a laptop or desktop computer can replace the conventional radio equipment as the base unit. Laptop computers have microphone inputs, speaker, or headphone outputs, a screen, and a keyboard. A software application or driver is configured to send and receive data through the remote digital antenna. Data can be audio, video, or even raw compressed data. Software assisted decompression can be used to watch or listen to digital television or radio.

Figure 1:
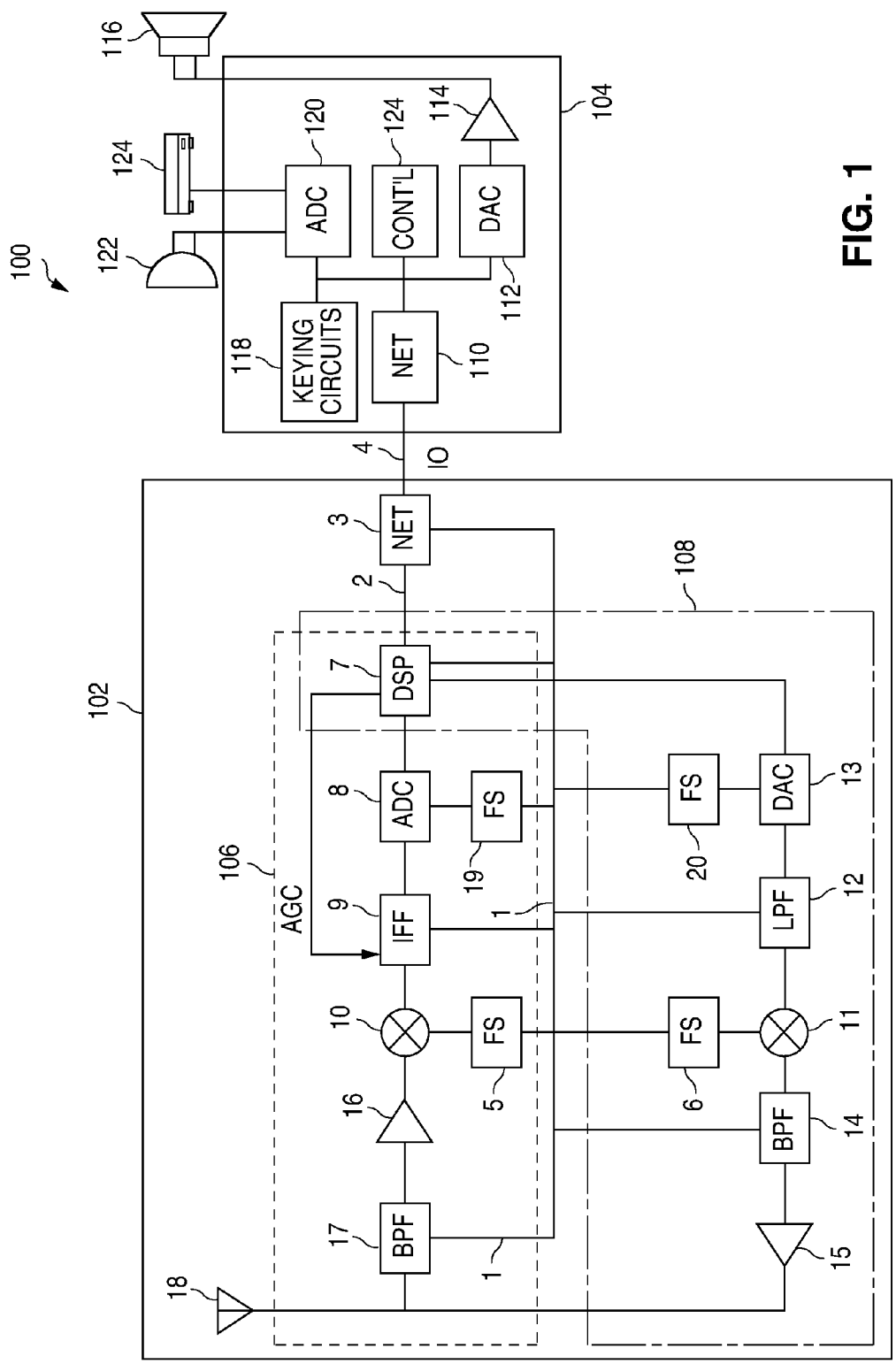
FIG. 1 illustrates an example digital radio system with an example digital antenna and an example base unit in one or more embodiments of the present disclosure.

FIG. 1 illustrates an example digital radio system 100 with an example digital antenna 102 and an example base unit 104 in one or more embodiments of the present disclosure.

Digital antenna 102 includes an antenna 18, a programmable radio tuner 106 coupled to the antenna, and a digital network interface device 3 coupled to the radio tuner. Antenna 18 may be a narrowband antenna or a wideband antenna depending on the application.

Radio tuner 106 includes a programmable band pass filter (BPF) 17 connected to antenna 18. BPF 17 reduces any unwanted interference. BPF 17 may be implemented using RF analog circuits. The properties of BPF 17 (e.g., the passband and the cutoff frequencies) may be digitally controlled via a control bus 1.

The output of BPF 17 is fed to an RF low-noise amplifier (LNA) 16. LNA 16 and BPF 17 generate a filtered and amplified RF signal from antenna 18. Note that the frequency of the RF signal is too high for digital signal processing at this stage. The output of LNA 16 is fed to a down-converting mixer 10. A programmable frequency synthesizer 5 generates a frequency signal that is also fed to down-converting mixer 10 to beat against the RF signal from LNA 16. Note that RF tuning is accomplished by varying the frequency signal generated by frequency synthesizer 5. The properties of frequency synthesizer 5 (e.g., the frequency) may be digitally controlled via control bus 1.

Down-converting mixer 10 produces waveforms at sum and difference frequencies. As only the difference frequency is of interest to the tuner, the output of down-converting mixer 10 is fed to a programmable intermediate frequency amplifier and filter (IFF) 9 to remove waveforms at the sum frequency. IFF 9 is typically configured as a low pass filter but may also be configured as a high pass filter. The properties of IFF 9 (e.g., the cutoff frequency and the configuration) may be digitally controlled via control bus 1.

IFF 9 generates an intermediate frequency (IF) signal that has a frequency that is low enough to permit digitization. The output of IFF 9 is fed to an analog to digital converter (ADC) 8. The sampling rate of ADC 8 is controlled by a programmable frequency synthesizer 19. The properties of frequency synthesizer 19 (e.g., the frequency) may be digitally controlled via control bus 1. The output of ADC 8 is fed to a digital signal processor (DSP) 7.

DSP 7 may implement any remaining radio functions. Signal processing may be performed with signal processing chips, FPGA devices, and custom integrated circuits. DSP 7 may implement a decimation filter in a first stage to reduce the processing load. DSP 7 may implement automatic gain control and provide a gain control signal to the amplifier in IFF 9.

DSP 7 may receive control and configuration signal from control bus 1. DSP 7 may also receive radio receiver algorithms from control bus 1. DSP 7 may implement various radio receiver algorithms to generate baseband signal data 2 from IF signal data. DSP 7 sends baseband signal data 2 to networking interface device 3. Network interface device formats baseband signal data 2 according to a network protocol and sends the baseband signal data over digital communication link 4 to base unit 104. Digital communication link 4 may carry both signal data and control data.

Digital antenna 102 may also include a programmable radio transmitter 108 coupled to network interface device 3 and antenna 8. Although FIG. 1 shows that radio transmitter 108 and radio tuner 106 share DSP 7 and both are coupled to antenna 18, separate DSPs and antennas may be provided for transmitting and receiving.

Network interface device 3 receives digital baseband signal over digital communication link 4 from base unit 104, and provides the digital baseband signal to DSP 7. DSP 7 may implement various radio transmitter algorithms to generate a digital IF signal from the digital baseband signal. Optionally DSP 7 may pre-modulate the digital baseband signal if desired with various standard modulation protocols. Pre-modulation basically creates a template of the modulated waveform to reduce time and energy required in the modulator to modulate the actual data content into the waveform. DSP 7 may also use pre-modulation filtering to limit the bandwidth of the modulation signal as opposed to limiting the bandwidth of the entire signal after modulation.

DSP 7 sends the digital IF signal to a digital to analog converter (DAC) 13. DAC 13 converts the digital IF signal to an analog IF signal. The sampling rate of DAC 13 is controlled by a programmable frequency synthesizer 20. The properties of frequency synthesizer 20 (e.g., the frequency) may be digitally controlled via control bus 1.

The output of DAC 13 is fed to a low pass filter (LPF) 12, which removes artifacts and clock noise generated by the DAC. The output of LPF 12 is fed to up-converting mixer 11. A programmable frequency synthesizer 6 generates a frequency signal that is also fed to up-converting mixer 11 to beat against the analog IF signal from LPF 12. The properties of frequency synthesizer 6 (e.g., the frequency) may be digitally controlled via control bus 1.

Up-converting mixer 11 produces waveforms at sum and difference frequencies. As only the sum frequency is of interest to the transmitter, a BPF 14 is used to pass only the sum frequency from up-converting mixer 11 to RF power amplifier 15. Note that higher sum frequencies may be present, so a high pass filter may not be sufficient. The properties of BPF 14 (e.g., the passband and the cutoff frequencies) may be digitally controlled by the control bus 1. RF power amplifier 15 provides an amplified analog RF signal to antenna 18 for transmission.

Network interface device 3 may receive control data from base unit 104 and outputs them on control bus 1 for the various devices in digital antenna 102. Network interface device 3 may include a network interface chip, a processor, and a control bus chip. In one or more embodiments, the processor may be included in the network interface chip. The processor may route signal data to DSP 7 and control data to control bus chip. Control bus chip writes the control data to control bus 1. Alternatively network interface device 3 provides the signal and control data to DSP 7, which then writes the control data for other components on control bus 1.

One or more of analog filters 9, 12, 14, and 17 may be digitally controlled via control bus 1. One or more of frequency synthesizers 5, 6, 19, and 20 may be digitally controlled by control bus 1. Various protocols of radio technology can be uploaded to the DSP 7 via control bus 1. For example, DSP 7 may be loaded with radio receiver algorithms to decode signals of any of the following format: AM, FM, HD radio, single-side band, analog or digital television broadcasts, WiMAX, 3G, 4G, LTE (Long Term Evolution), CDMA, and GSM. DSP 7 interfaces with network interface device 3, which implements a standard digital transmission protocol over digital communication link 4. Digital communication link 4 may be wired or wireless. For a wired communication link, the transmission protocol may be Ethernet, USB, 1394, PCI Express, SPI, or any other evolving wired digital communications protocol. For a wireless communication link, the transmission protocol may be WiFi, Bluetooth, or any other standard short distance wireless protocol.

Digital antenna 102 is couple by digital communication link 4 to base unit 104. Base unit 104 includes a controller 124 that performs internal data transfers, device initialization, and interface control. A digital network interface device 110 coupled to digital communication link 4. Network interface device 110 receives the baseband signal data from digital antenna 102 and provides the signal data to a DAC 112. DAC 112 converts the baseband signal data to an analog baseband signal. The output of DAC 112 is fed to a power amplifier 114, which drives one or more speakers 116.

Network interface device 110 may receive user input from a keying circuit 118 (e.g., to tune to a new RF), converts the user commands to control data, and sends the control data over digital communication link 4 to digital antenna 102. A microphone 120 or another source 124 may provide an analog baseband signal to an ADC 120, which converts it to digital. Network interface device 110 may receive the digital baseband signal from ADC 120 and transmit the signal data over digital communication link 4 to digital antenna 102 for transmission.

Figure 2:
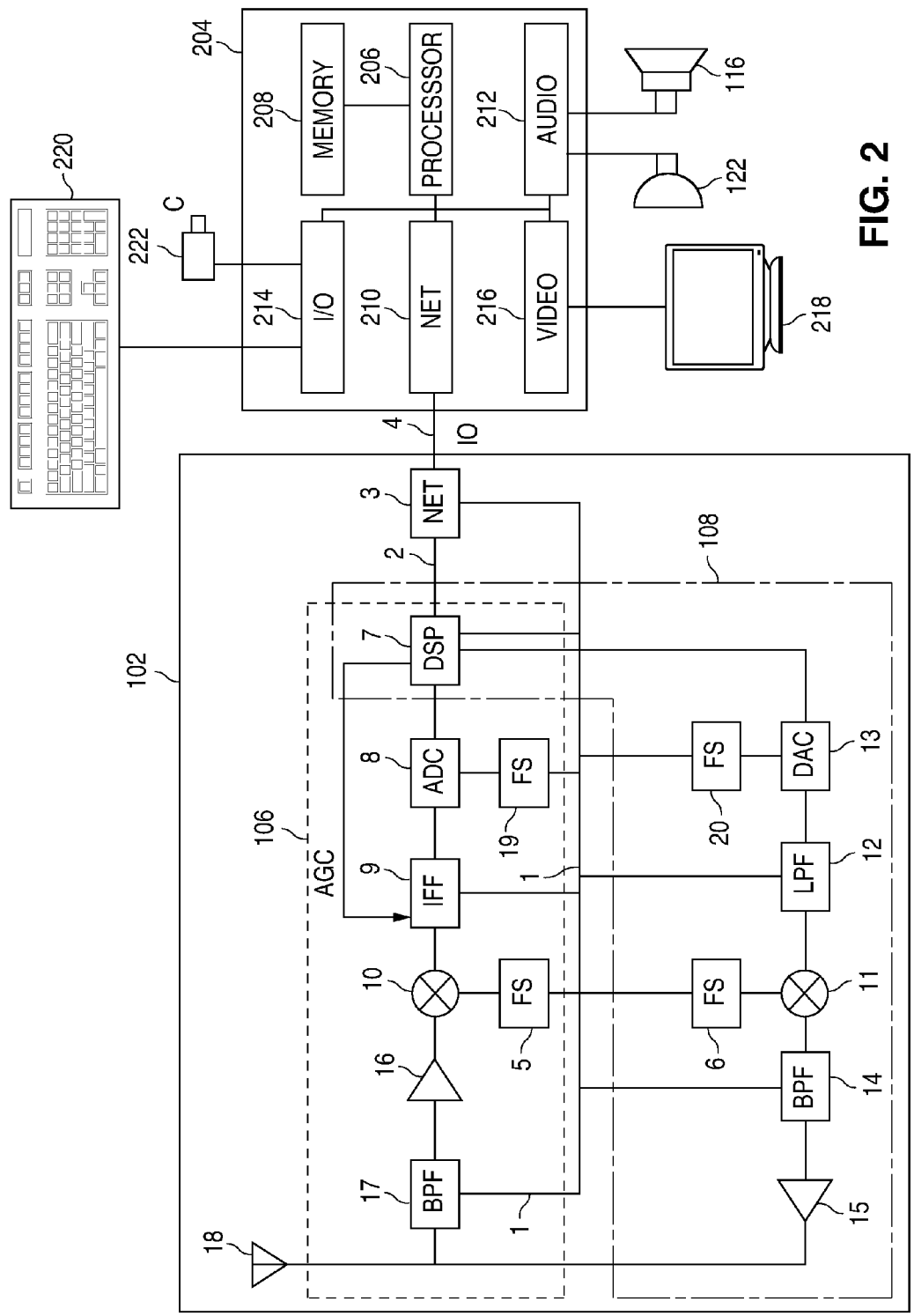
FIG. 2 illustrates an example digital radio system with an example digital antenna and an example media player in one or more embodiments of the present disclosure.

FIG. 2 illustrates an example digital radio system 200 in one or more embodiments of the present disclosure. System 200 is similar to system 100 described above except base unit 104 has been replaced with a base unit 204 that is implemented with a computer (e.g., a laptop computer). Computer 204 includes a processor 206 connected to a memory 208, a network interface card 210, a sound card 212, an I/O circuitry 214 (e.g., USB circuitry), and a graphics card 216. Processor 206 performs internal data transfers, device initialization, and interface control.

Sound card 212 may receive baseband signal data from network interface card 210 and drive speakers 116. Sound card 212 may also receive baseband signal from a microphone 122 and provide baseband signal data to network interface card 210 for transmission to digital antenna 102. Graphics card 216 may receive baseband signal data from network interface card 210 and drive a monitor 218. I/O circuitry 214 may receive user command from an input device 220, convert the user command to control data, and provide the control data to network interface card 310 for transmission to digital antenna 102. I/O circuitry 214 may also receive baseband signal from a camera 222 and provide baseband signal data to network interface card 210 for transmission to digital antenna 102.

Figure 3:
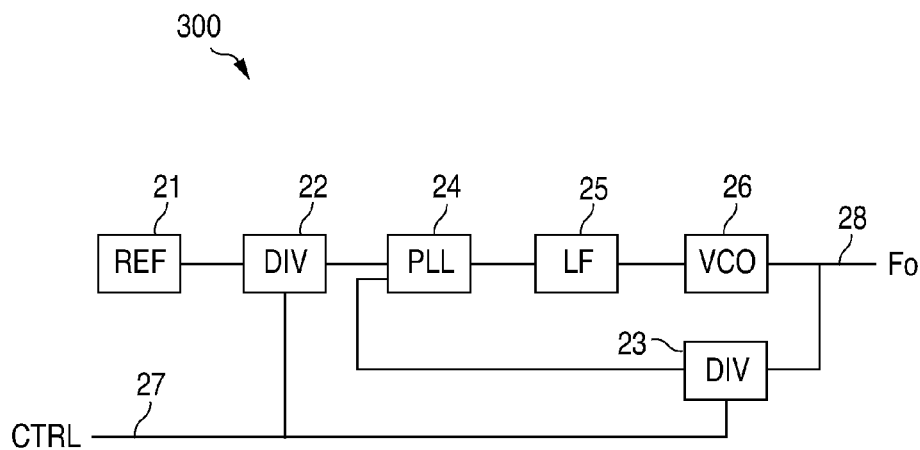
FIG. 3 illustrates an example programmable frequency synthesizer in the digital radio system of FIG. 1 or 2 in one or more embodiments of the present disclosure.

FIG. 3 illustrates an example programmable frequency synthesizer 300 in the digital radio system of FIG. 1 or 2 in one or more embodiments of the present disclosure. Frequency synthesizer 300 may be used for frequency synthesizer 5, 6, 19, and 20 in digital antenna 102. A reference oscillator 21 provides an oscillating signal to a programmable divider 22. A phase lock loop (PLL) 24 compares the frequency of divider 22 with the divided frequency of output signal 28 provided by a programmable divider 23. The frequency of output signal 28 is equal to the reference frequency provided by reference oscillator 21 divided by divider 22 and multiplied by divider 23. A loop filter 25 keeps the feedback control system stable. The output of loop filter 25 is fed to a voltage-controlled oscillator (VCO) 26, which provides output signal 28.

Antenna 18 may utilize standard power transmission means. For very high power, 330V 3-phase lines can be used. For medium power, standard 120V AC or DC power can be used. For lower power devices, power can be combined with the digital signal. This is typically 48V. There is no requirement that power supply and signal occupy the same cable.

The cost of introducing these transmitter and receiver circuits for digital communication link 4 is lower than the cost of building expensive waveguides or low-loss RF coaxial cable. Maintenance cost is also reduced. Reliability, signal quality, and power efficiency are greatly enhanced due the digital signal processing.

Various configurations of digital antenna 102 are possible. If a receive-only antenna is needed, blocks 15, 14, 11, 12, 13, and 6 can be removed. Conversely if a transmit-only antenna is needed, blocks 17, 6, 10, 9, 8, and 5 can be removed. Any of the programmable filters, frequency synthesizers and signal processing algorithms can be fixed. Another possible configuration comprises removing the ADC 8 and DAC 13 and replacing block 7 with analog signal processing circuits. These analog circuits can still be controlled via control bus 1. The final output of such an analog signal processor may be converted to digital before it communicates with digital network interface device 3.

Figure 4:
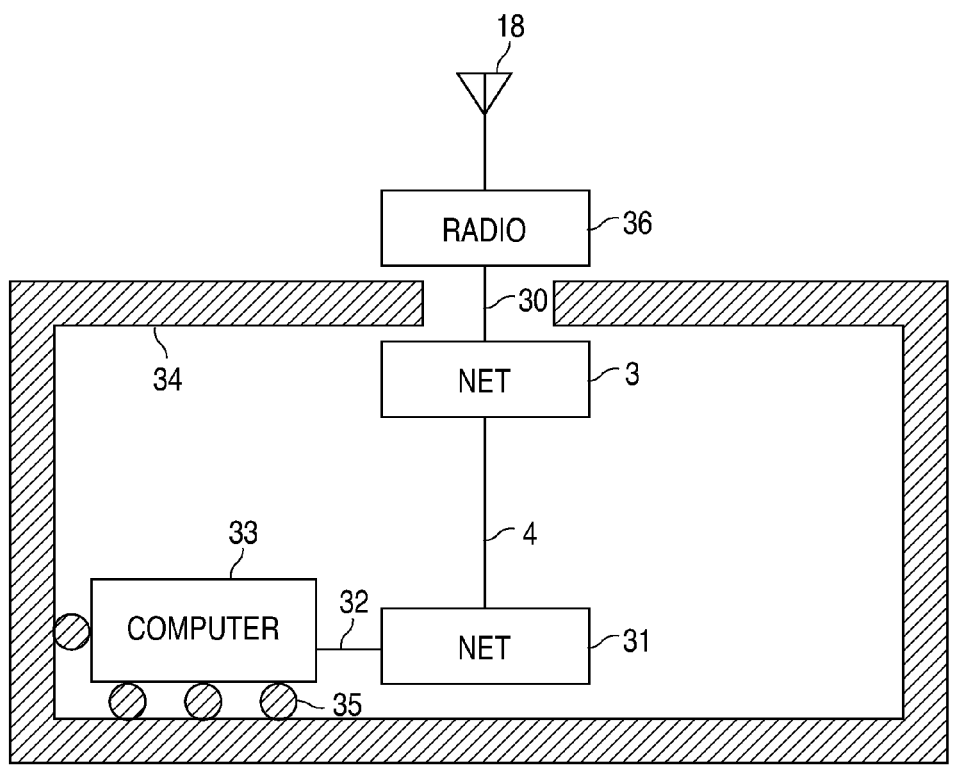
FIG. 4 illustrates an example vehicle utilizing the digital radio system of FIG. 1 or 2 in one or more embodiments of the present disclosure.

FIG. 4 illustrates an example motor vehicle utilizing digital radio system 100 or 200 in one or more embodiments of the present disclosure. The motor vehicle may be a car, a boat, or a plane. Antenna 18 may be mechanically attached to the outer surface of a metal body 34 of the motor vehicle, which provides a good ground reference. Antenna 18 is coupled to a radio device 36. Radio device 36 may include radio tuner 106, radio transmitter 108, or both. Signal quality is good because antenna 18 and radio device 36 are external to the vehicle and their interconnection is very short. Radio device 36 is coupled by a short wired link 30 to network interface device 3 within the vehicle. Wired link 30 may use a different protocol than the external antenna. Alternatively network interface device 3 is located external to the vehicle with antenna 18 and radio device 36, A base unit 104 resides in the vehicle. Base unit 104 may be a laptop computer 33. Computer 33 also includes a network interface device 31, which is coupled by digital communication link 4 to network interface device 3. Digital communication link 4 may be a USB cable, an Ethernet cable, or even a wireless communication link such as WiFi or Bluetooth.

When digital communication link 4 is a wireless communication link, digital antenna 102 acts like a protocol conversion device. Unlike other systems, control information is transmitted along with the baseband data in digital communication link 4. Inside the car, communication between digital antenna 102 and base unit 104 is good because wireless communication link 4 is tamed and protected from radio interference thanks to the metallic exterior 34.

Antenna 18 can support anything from AM radio to GPS to WiMAX. Computer 33 now receives pure digital data from digital antenna 102 and can act like a television, a CB radio, or an AM/FM radio. Computer 33 has the necessary user interface means to provide a universal connection to all conceivable external radio resources.

One benefit of the present disclosure is the ability to upload different radio receiver software that reconfigures digital antenna 102 to accommodate a new evolving protocol. It is also possible to install a multiplicity of digital antennas, which enable multiple simultaneous and concurrent radio systems including AM/FM, HD radio, CB radio, weather, police band, analog or digital television broadcasts, and Internet connectivity. The in-dash radio equipment can conceivably be a mobile computer system; modern computers have sufficient multimedia capability to implement a virtual radio system. This configuration could improve reception of cellular mobile communications such as cdmaOne and GSM. WiMAX can be received on the digital antenna and WiFi transmitted inside the vehicle. Phones equipped with WiFi hot point access can prevent runtime minutes from being wasted.

Various other adaptations and combinations of features of the embodiments disclosed are within the scope of the present disclosure. For example, radio system 100 or 200 may be applied to a building instead of a car. In such an embodiment, antenna 18 and radio device 36 may be located exterior of the building while the remaining components are located inside the building. Numerous embodiments are encompassed by the following claims.

What is claimed is:

1. A radio system for a motor vehicle, comprising:
   a digital antenna, comprising:
   an antenna located on the exterior of the motor vehicle;
   a programmable radio tuner coupled to the antenna to selectively tune to a radio frequency (RF) and convert a RF signal to a baseband signal, the programmable radio tuner being located on the exterior of the motor vehicle;
   a first network interface coupled to the programmable radio tuner to receive the baseband signal and to convert the baseband signal to a network data signal;
   a digital link coupled to the first network interface; and
   a base unit located within the interior of the motor vehicle, comprising:
   a second network interface coupled to the digital link to convert the network data signal to the baseband signal.

2. The radio system of claim 1, wherein the base unit further comprises a processor, the processor decoding the baseband signal to one or more of an audio signal, a video signal, and an audio/visual signal.

3. The radio system of claim 1, wherein the digital link is a wireless link and the first network interface is located within the interior of the motor vehicle.

4. The radio system of claim 1, wherein the digital link is a wired or a wireless link, and the first network interface is located within the interior of the motor vehicle or on the exterior of the motor vehicle.

5. The radio system of claim 1, wherein the base unit further comprises a user interface for receiving the RF to be tuned to, the base unit providing a control signal with the RF to the second network interface, the second network interface converting the control signal to a network control signal, the first network interface converting the network control signal to the control signal and providing the control signal to the programmable radio tuner.

6. The radio system of claim 1, wherein the digital link is an Ethernet, USB, or PCI Express link.

7. The radio system of claim 1, wherein the digital link is a WiFi or Bluetooth wireless link.

8. The radio system of claim 1, wherein the RF signal is an AM signal, a FM signal, an HD radio signal, a single-side band signal, an analog TV broadcast signal, a digital TV broadcast signal, a WiMAX signal, a 3G signal, a 4G signal, an LTE (Long Term Evolution) signal, a CDMA signal, or a GSM signal.

9. The radio system of claim 1, wherein the programmable radio tuner comprises an RF band pass filter coupled to the antenna, a low noise amplifier coupled to the RF band pass filter, a frequency synthesizer, a programmable down-converting mixer coupled to the low noise amplifier and the frequency synthesizer, an intermediate frequency (IF) amplifier and filter coupled to the programmable down-converting mixer, an analog-to-digital converter (ADC) coupled to the IF filter, and a digital signal processor coupled to the ADC.

10. The radio system of claim 9, wherein the digital signal processor comprises software instructions for a software radio.

11. The radio system of claim 9, wherein one or more of the RF band pass filter, the frequency synthesizer, and the IF amplifier and filter are programmable.

12. The radio system of claim 9, wherein the digital signal processor performs digital signal processing to the baseband signal prior to providing the baseband signal to the first network interface device.

13. The radio system of claim 1, further comprising a programmable radio transmitter coupled to the first network interface and the antenna, wherein the base unit provides an other baseband signal to the second network interface, the second network interface converting the other baseband signal to an other network data signal, the first network interface converting the other network data signal to the other baseband signal and providing the other baseband signal to the programmable radio transmitter.

14. The digital radio system of claim 13, wherein the programmable radio transmitter comprises an RF power amplifier coupled to the antenna, a band pass filter coupled to the RF power amplifier, a frequency synthesizer, a programmable up-converting mixer coupled to the band pass filter and the frequency synthesizer, a low pass filter coupled to the programmable up-converting mixer, and a digital-to-analog converter coupled to the programmable up-converting mixer, a digital signal processor coupled to the digital-to-analog converter.

15. The digital radio system of claim 14, wherein one or more of the band pass filter, the frequency synthesizer, and the low pass filter are programmable.

16. The digital radio system of claim 14, wherein base unit further comprises a processor, the processor performs digital signal processing to the other baseband signal prior to providing the other baseband signal to the second network interface device.

* * * * *